United States Patent
Huang

(10) Patent No.: US 8,971,867 B2
(45) Date of Patent: Mar. 3, 2015

(54) REMOTE CONTROL METHOD AND REMOTE CONTROL SYSTEM

(71) Applicant: Wistron Corporation, New Taipei (TW)

(72) Inventor: Yu-Chang Huang, New Taipei (TW)

(73) Assignee: Wistron Corporation, New Taipei (TW)

( * ) Notice: Subject to any disclaimer, the term of this patent is extended or adjusted under 35 U.S.C. 154(b) by 30 days.

(21) Appl. No.: 13/705,187

(22) Filed: Dec. 5, 2012

(65) Prior Publication Data

US 2014/0087703 A1 Mar. 27, 2014

(30) Foreign Application Priority Data

Sep. 27, 2012 (TW) .............. 101135566 A

(51) Int. Cl.
*H04M 3/42* (2006.01)
*H04W 4/16* (2009.01)
*H04M 3/533* (2006.01)
*H04M 3/54* (2006.01)

(52) U.S. Cl.
CPC ............ *H04W 4/16* (2013.01); *H04M 3/53308* (2013.01); *H04M 3/541* (2013.01); *H04M 3/42* (2013.01); *H04M 3/54* (2013.01); *H04M 3/42059* (2013.01)
USPC ...... 455/417; 455/415; 455/414.1; 455/414.2

(58) Field of Classification Search
CPC ............. H04M 3/54; H04M 3/42059; H04M 3/42348; H04M 3/42365; H04M 3/53308; H04M 3/541; H04M 3/42; H04W 4/16
USPC ............ 455/414.1, 418, 419, 417, 415, 414.2
See application file for complete search history.

(56) References Cited

U.S. PATENT DOCUMENTS

| | | | | |
|---|---|---|---|---|
| 5,915,224 A | * | 6/1999 | Jonsson | 455/552.1 |
| 6,631,187 B1 | * | 10/2003 | Juhola et al. | 379/211.02 |
| 2006/0111136 A1 | * | 5/2006 | Song | 455/519 |
| 2007/0047706 A1 | * | 3/2007 | Starling | 379/114.03 |
| 2009/0181654 A1 | * | 7/2009 | Koch et al. | 455/414.1 |
| 2012/0275442 A1 | * | 11/2012 | Malets et al. | 370/338 |
| 2013/0072171 A1 | * | 3/2013 | Sahai et al. | 455/417 |

* cited by examiner

Primary Examiner — Khai M Nguyen
(74) Attorney, Agent, or Firm — Jianq Chyun IP Office

(57) ABSTRACT

A remote control method is provided. The method is adapted to a first terminal apparatus, and the first terminal apparatus corresponds to a first phone number. The remote control method includes the following steps. A second terminal apparatus is connected to a telecommunication server, wherein the telecommunication server corresponds to a telecommunication service provider who provides the first phone number a telecommunication service. A call diversion service is activated on the telecommunication server through the second terminal apparatus in order to divert a telecommunication signal which is to be forwarded to the first phone number to a second phone number.

11 Claims, 4 Drawing Sheets though the second terminal apparatus, a call diversion service is activated on the telecommunication server in order to divert a telecommunication signal which is to be forwarded to the first phone number to a second phone number.

REMOTE CONTROL METHOD AND REMOTE CONTROL SYSTEM

CROSS-REFERENCE TO RELATED APPLICATION

This application claims the priority benefit of Taiwan application serial no. 101135566, filed on Sep. 27, 2012. The entirety of the above-mentioned patent application is hereby incorporated by reference herein and made a part of this specification.

BACKGROUND OF THE DISCLOSURE

1. Field of Invention

The present disclosure relates to a remote control method. More particularly, the present disclosure relates to a remote control method and a remote control system which are capable of activating a call diversion service.

2. Description of Related Art

In an information era where the development of the electronic industry is booming, people's life cannot separated from the electronic telecommunication. The electronic devices, especially the portable electronic devices such as the mobile phone or the electronic device having the telecommunication functions, are used to transmit message to each other or to exchange information between people. These electronic devices having the telecommunication functions not only decrease the distance between people, but also increase the convenience of daily life.

With the increasing of the dependency on the electronic device, if people forget to carry the mobile phone or the mobile phone runs out of the power, he/she would be anxious about missing important phone call. Therefore, the telecommunication service provider further provides a call diversion service. In the call diversion service, the user sets a diversion phone number, the diversion phone number is transmitted to the control room of the telecommunication service provider and the control room put through the incoming call to the previous set diversion phone number. Therefore, even the user is currently not at home, he/she still can answer all incoming phones.

If the user is out of town to another place and finds out that he/she forgets to carry the mobile phone or forgets to set the call diversion service before leaving the house or the mobile phone runs out of the power and there no way to recharge the mobile phone, it is impossible to answer the call forwarded to the phone number corresponding to the mobile phone. Thus, the user can only inform everyone who is possible to call him/her the situation and other contact information in case they want to find him/her. Therefore, the call diversion service cannot be activated any time any where and the inconvenience is increased.

SUMMARY OF THE DISCLOSURE

The present disclosure is to provide a remote control method capable of improving the convenience of using and setting the call diversion service.

The present disclosure provides a remote control system capable of avoiding the missing call situation by activating the call diversion service of the phone number through connecting a terminal apparatus other than the one corresponding to the phone number to the telecommunication server of the telecommunication service provider.

The present disclosure provides a remote control method for a first terminal apparatus, wherein the first terminal apparatus corresponds to a first phone number. The method includes connecting a second terminal apparatus to a telecommunication server, wherein the telecommunication server corresponds to a telecommunication service provider who provides the first phone number a telecommunication service. Through the second terminal apparatus, a call diversion service is activated on the telecommunication server in order to divert a telecommunication signal which is to be forwarded to the first phone number to a second phone number.

The present disclosure further provides a remote control system. The remote control system includes a first terminal apparatus, a second terminal apparatus and a telecommunication server. The first terminal apparatus corresponds to a first phone number. The telecommunication server corresponds to a telecommunication service provider providing the first phone number a telecommunication service and the telecommunication server comprises a telecommunication interface, a storage device and a processing unit. The second terminal apparatus connects to the telecommunication server through the telecommunication interface. The storage device stores a computer readable and writable program. The processing unit executes a plurality of instructions of the computer readable and writable program, wherein the instructions comprises, according to an operation instruction from the second terminal apparatus, activating a call diversion service on the telecommunication server in order to divert a telecommunication signal which is to be forwarded to the first phone number to a second phone number.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the disclosure, and are incorporated in and constitute a part of this specification. The drawings illustrate embodiments of the invention and, together with the description, serve to explain the principles of the disclosure.

DESCRIPTION OF THE PREFERRED EMBODIMENTS

The present disclosure provides a remote control method of a call diversion service. While user does not carry the terminal apparatus with him/her or the terminal apparatus belonging to the user is out of service, the user can use another terminal apparatus to connect to the telecommunication server of the telecommunication service provider and activate a call diversion service on the telecommunication server so that the telecommunication signal supposed to be transmitted to the user's terminal apparatus is diverted to a designated telephone number. Therefore, the process for activating the call diversion service become more convenient for the user. In order to clearly describe the present invention, several embodiments as the enforceable exemplars of the present disclosure are illustrated in the following paragraphs.

Figure 1:
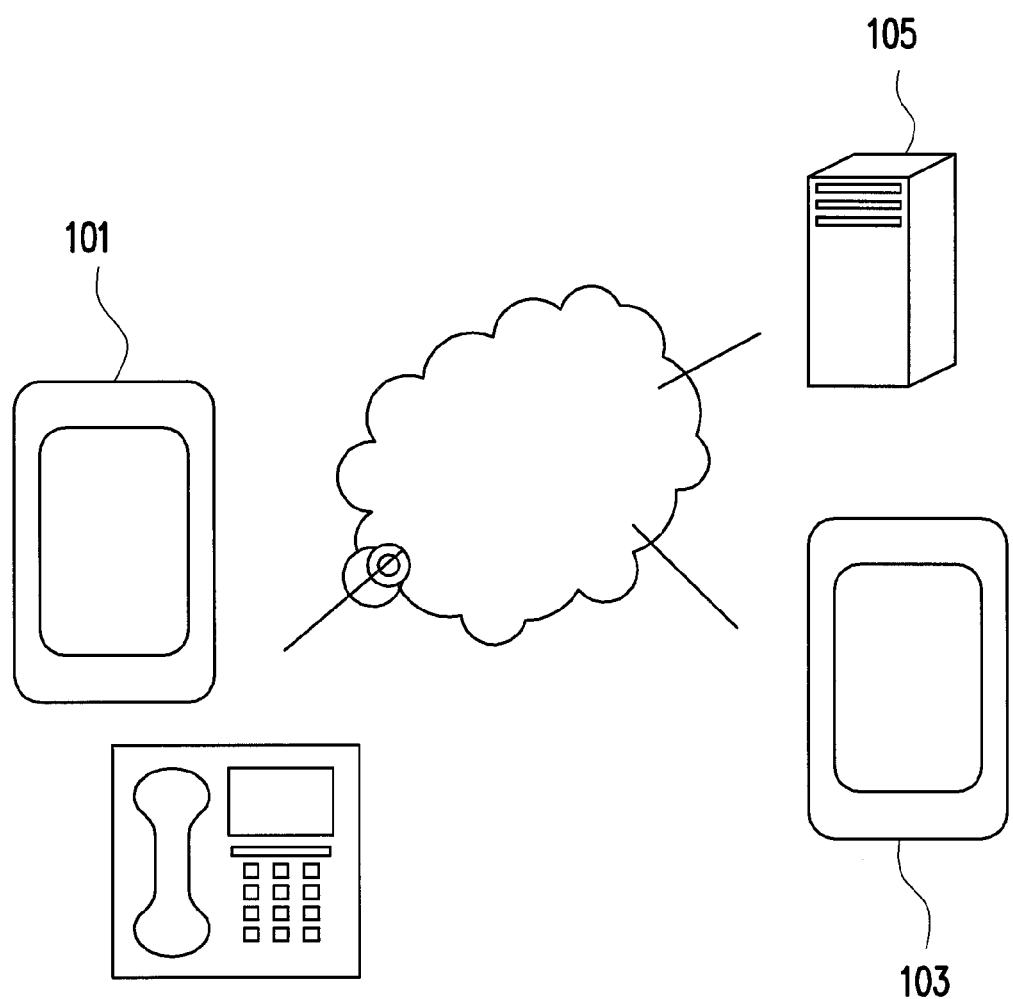
FIG. 1 is a schematic diagram showing a structure of a remote control system according to one embodiment of the present disclosure.

FIG. 1 is a schematic diagram showing a structure of a remote control system according to one embodiment of the present disclosure. As shown in FIG. 1, a remote control system 10 includes a first terminal apparatus 101, a second terminal apparatus 103 and a telecommunication server 105. The first terminal apparatus 101 and the second terminal apparatus 103 can be any electronic device having the telecommunication function, such as a personal digital assistant (PDA), a smart phone or a tablet personal computer. The first terminal apparatus 101 and the second terminal apparatus 103 respectively correspond to a phone number and can be connected to the telecommunication server 105 through the network. The telecommunication server 105 can be, for example, the server of a telecommunication service provider which provides the corresponding phone number to the first terminal apparatus. In the present embodiment, the network can be the global system for mobile communication (GSM) network, the code division multiple access (CDMA) network, the general packet radio service (GPRS) or other similar networks and the present invention is not limited thereto.

Figure 2:
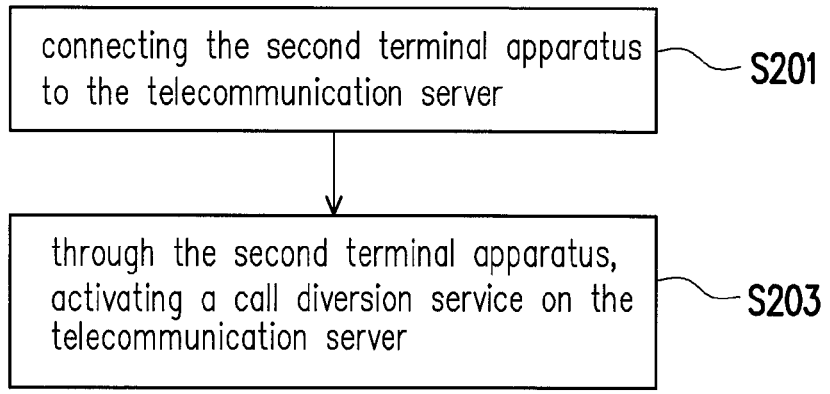
FIG. 2 is a flow chart illustrating a remote control method according to one embodiment of the present disclosure.

FIG. 2 is a flow chart illustrating a remote control method according to one embodiment of the present disclosure. As shown in FIG. 1 and FIG. 2, in the step S201, while the first terminal apparatus 101 is at a signal transmitting-and-receiving termination state, a system idle state or a no-responding state, the user uses the second terminal apparatus 102 to connected to the telecommunication server 103 through the network. In the present embodiment, the first terminal apparatus 101 corresponds to a first phone number and the telecommunication server 103 corresponds to a telecommunication service provider who provides the first phone number a telecommunication service. It should be noticed that, in the present embodiment, the first terminal apparatus is different from the second terminal apparatus.

In the step S203, through the second terminal apparatus 102, a call diversion service is activated on the telecommunication server 103 in order to divert a telecommunication signal which is to be forwarded to the first phone number to a second phone number. Noticeably, the terminal apparatus corresponding to the second phone number can be the second terminal apparatus through which the call diversion service is activated or can be other terminal apparatus which is easily accessed by the user and possesses telecommunication functions and the present disclosure is not limited thereto.

In addition, the first terminal apparatus 101 in the aforementioned embodiment is at the signal transmitting-and-receiving termination state, the system idle state or the no-responding state. The signal transmitting-and-receiving termination state is, for example, that the terminal apparatus is shutdown because it runs out of the power and the user cannot operate this terminal apparatus to receive or transmit signals. Moreover, the no-responding state can be, for example, a state at which the user cannot personally answer or response the incoming call or message because the user leaves the terminal apparatus at some places where the terminal apparatus cannot be controlled the user. For instance, when the user leaves the mobile phone at home, the user cannot instantly answer the incoming call or response the miss call, which is regarded as the no-responding state of the terminal apparatus. In the present disclosure, to avoid from missing important incoming call, the user can activate a call diversion service of the particular phone number through a mobile phone or a phone with a fixed phone line (such as the corded phone or the cordless phone) and the user can set the phone number the call is diverted to according to the convenience. That is, the user can divert the call to a phone number of a friend nearby or to an office phone number. Hence, the flexibility and the convenience of the call diversion service are improved.

However, the implementation method of the present disclosure is not limited to the description mentioned above and can be further adjusted according to the practical demands. For instance, in another embodiment of the present disclosure, before the call diversion service is activated, an identification process is performed to avoid the call diversion service from being randomly activated by some other persons or prevent the setting of the call diversion service from being changed without being authorized. In the following paragraphs, another embodiment is used to further illustrate the identification process.

Figure 3:
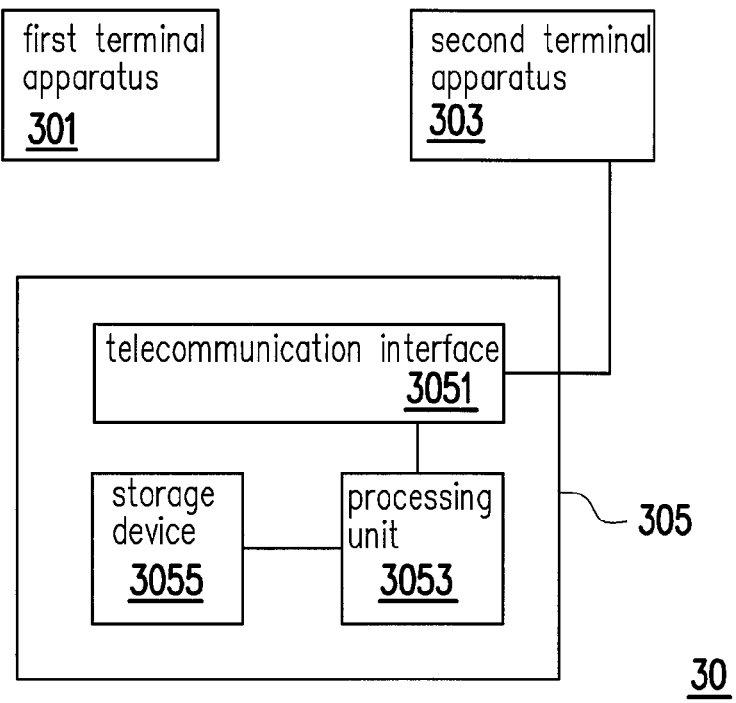
FIG. 3 is a schematic block diagram showing a remote control system according to one embodiment of the present disclosure.

FIG. 3 is a schematic block diagram showing a remote control system according to one embodiment of the present disclosure. As shown in FIG. 3, a remote control system 30 includes a first terminal apparatus 301, a second terminal apparatus 303 and a telecommunication server 305. The first terminal apparatus 301 corresponds to a first phone number. The telecommunication server 305 corresponds to a telecommunication service provider providing the first phone number a telecommunication service. In other words, the telecommunication service provider who provides the telecommunication server to the first terminal apparatus has a telecommunication server 305 for providing the telecommunication service to the end user.

The telecommunication server 305 includes a telecommunication interface 3051, a storage device 3055 and a processing unit 3053. The second terminal apparatus 303 connects to the telecommunication server 305 through the telecommunication interface 3051. The storage device 3055 stores a computer readable and writable program. The processing unit 3053 can be a micro-processor, an embedded controller or a central processing unit (CPU) for executing a plurality of instructions of the computer readable and writable program. In the present embodiment, these instructions comprise activating a call diversion service according to an operation command from the second terminal apparatus 303 so as to divert a telecommunication signal which is to be forwarded to the first phone number to a second phone number.

Figure 4:
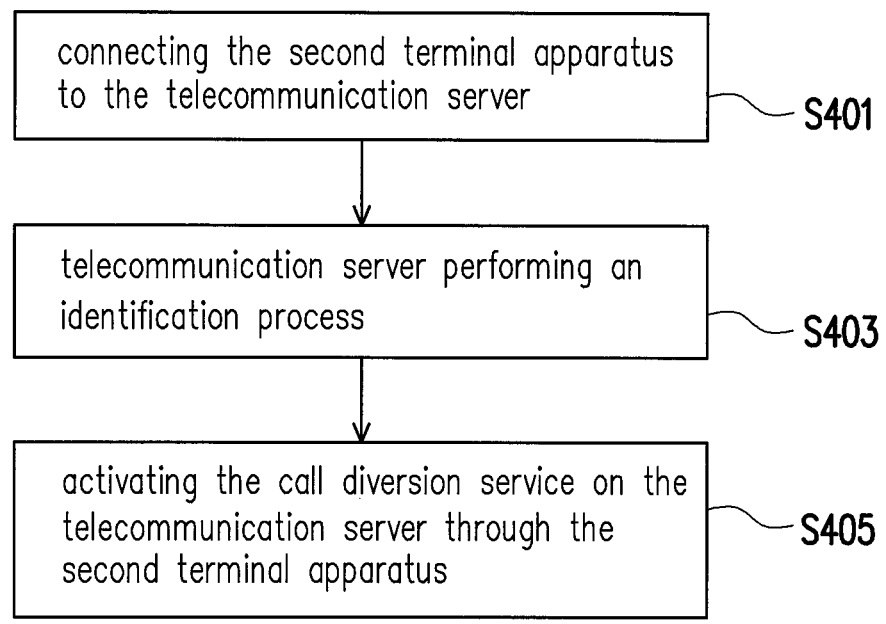
FIG. 4 is a flow chart illustrating a step of activating a call diversion service in the remote control method according to one embodiment of the present disclosure.

FIG. 4 is a flow chart illustrating a step of activating a call diversion service in the remote control method according to one embodiment of the present disclosure. As shown in FIG. 4, the method of the present embodiment is used for the remote control system 30 shown in FIG. 3 and the steps of the remote control method are illustrated accompanied with the elements in the remote control system 30 in the following paragraphs.

In the step S401, the second terminal apparatus 303 is connected to the telecommunication server 305. The telecommunication server 305 corresponds to a telecommunication service provider providing the first phone number a telecommunication service and the first phone number corresponds to the first terminal apparatus 301. In the step S403, the telecommunication server performs an identification process on the first phone number to make sure that the call diversion service of the first phone number is activated by the owner of the first phone number. If the identification process is failed, the call diversion service cannot be activated. In the step S405, through the second terminal apparatus 303, the call diversion service is activated on the telecommunication server 305 to divert a telecommunication signal which is to be forwarded to the first phone number to a second phone number.

More specifically, the storage device 3055 of the telecommunication server 305 stores a computer readable and writable program. When the telecommunication server 305 receives an operation command from the second terminal apparatus 303 through the telecommunication interface 3051, the processing unit 3053 of the telecommunication server 305 starts to execute the instructions of the computer readable and writable program mentioned above. These instructions comprise the processing unit 3053 executing the identification process and determining whether the identification process is successful. If the identification process is successful, the call diversion service is activated according to the operation command from the second terminal apparatus 303 and the telecommunication signal which is to be forwarded to the first phone number is diverted to the second phone number. In other words, the incoming call or the telecommunication signal which is supposed to be forwarded to the first phone number are diverted to the terminal apparatus corresponding to the second phone number so that the user can use the terminal apparatus corresponding to the second phone number to answer the incoming call or the to receive the telecommunication signal which are supposed to be forwarded to the first phone number.

In addition, in the step S401, the method of connecting the second terminal apparatus 303 to the telecommunication server 305 can comprise, for example, using the second terminal apparatus 303 to dial the first phone number to connect the second terminal apparatus 303 to the telecommunication server 305 so as to enter a voice mail box corresponding to the first phone number in the telecommunication server 305. Moreover, the method of connecting the second terminal apparatus 303 to the telecommunication server 305 can comprise, for example, using the second terminal apparatus 303 to dial a customer service phone number of the telecommunication service provider to connect the second terminal apparatus 303 to the telecommunication server 305. The second terminal apparatus 303 dialing the first phone number to connect the second terminal apparatus 303 to the voice mail box corresponding to the first phone number in the telecommunication server 305 is illustrated in the following embodiment.

Figure 5:
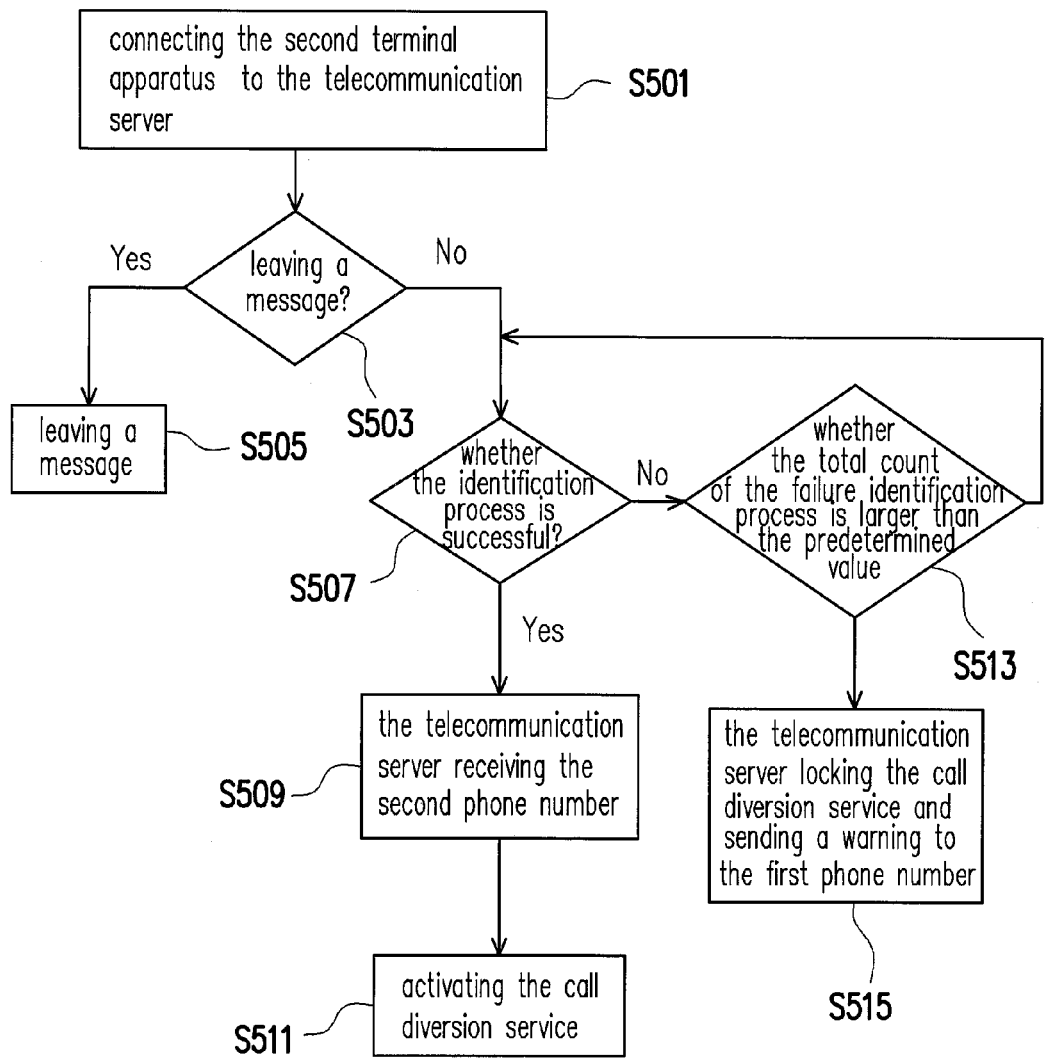
FIG. 5 is a flow chart illustrating a remote control method according to one embodiment of the present disclosure.

When the incoming call to the mobile phone is not answered or the mobile phone runs out of power, the telecommunication service provider diverts the incoming telecommunication signal to a voice mail box and request the person who makes the phone call to leave a message. In the following embodiment, according to the features mentioned above, an embodiment illustrates that the person/user who makes the phone call but the phone call is not going through determines whether he/she is willing to enter the voice mail box to leave a message or to activate the call diversion service. FIG. 5 is a flow chart illustrating a remote control method according to one embodiment of the present disclosure. As shown in FIG. 5, in the step S501, the user uses the second terminal apparatus to dial the first phone number to connect the second terminal apparatus to the telecommunication server so as to enter a voice mail box corresponding to the first phone number in the telecommunication server. It should be noticed that, in the present embodiment, the first terminal apparatus is different from the second terminal apparatus.

In the step S503, the person/user who makes the phone call determines whether to leave a message or activate the call diversion service. When the person/user who makes the phone call determines to leave a message, in the step S505, the person/user who makes the phone call is put through to the voice mail box so that he/she can leave a message in the voice mail box. When the person/user who makes the phone call determines to activate the call diversion service (that is the person/user who makes the phone call is willing to activate the call diversion service through the connection of the voice mail box), the step S507 is proceeded. In the step S507 of the present embodiment, the telecommunication server further performs an identification process on the first phone number. This identification process is used to prevent the call diversion service from being activated by some other persons without being authorized or to avoid the telecommunication setting corresponding to the phone number in the telecommunication server from being changed by some intended people. For instance, the identification process can be implemented by inputting the password and the password can be the personal identification number (PIN) of the mobile phone, the subscriber identity module (SIM) card number or the codes set by the user himself/herself and the present invention is not limited thereto.

When the person/user who makes the phone call successfully goes through the identification process (the step S507) to prove that the person/user who makes the phone call is the owner of the first phone number indeed, in the step S509, the telecommunication server receives a second phone number from the second terminal apparatus. Then, in the step S511, the call diversion service is activated to divert the telecommunication signal which is supposed to be forwarded to the first phone number to the second phone number. Therefore, the incoming calls or the telecommunication signals to be forwarded to the first phone number are all diverted to the second phone number and the user can use the terminal apparatus corresponding to the second phone number to answer the incoming calls or to receive the telecommunication signals.

Moreover, in the present embodiment, it further exists a protection mechanism. When the identification process is failed in the step S507, the count of the failure identification accumulated to determine the total count of the failure identification is larger than a predetermined value (the step S513). If the total count of the failure identification is larger than the predetermined value, in the step S515, the telecommunication server locks the call diversion service so that the call diversion function is no longer applicable and sends a warning to the first phone number to inform the owner of the first phone number that someone else tries to change the telecommunication setting of the first phone. By using the aforementioned identification process and the protection mechanism, it prevents the call diversion service from being randomly activated by some other persons so as to enhance the security.

Altogether, in the present disclosure, the user uses the second terminal apparatus to connect to the telecommunication server of the telecommunication service provider so as to set and activate the call diversion service of the first phone number. Hence, the user can issue the request for activating the call diversion service through the currently available and accessible terminal apparatus to achieve the goal of improving the convenient of activating the call diversion service. Moreover, since the user can activate the call diversion service through other terminal apparatus any time any where, the problem of forgetting setting the call diversion service or the problem of missing incoming call because of forgetting carrying the mobile phone can be overcome. Furthermore, since the user can self set the target phone number which the call is diverted to by will, the flexibility and the convenience of the call diversion service are improved.

It will be apparent to those skilled in the art that various modifications and variations can be made to the structure of the present disclosure without departing from the scope or spirit of the disclosure. In view of the foregoing descriptions, it is intended that the present disclosure covers modifications and variations of this disclosure if they fall within the scope of the following claims and their equivalents.

What is claimed is:

1. A remote control method for a first terminal apparatus, wherein the first terminal apparatus corresponds to a first phone number, the method comprising:
    connecting a second terminal apparatus to a telecommunication server, wherein the telecommunication server corresponds to a telecommunication service provider who provides the first phone number a telecommunication service;
    through using the second terminal apparatus to dial the first phone number to connect the second terminal apparatus to the telecommunication server, activating a call diversion service on the telecommunication server in order to divert a telecommunication signal which is to be forwarded to the first phone number to a second phone number; and, before the step of activating the call diversion service, the telecommunication server performing an identification process on the first phone number;
    wherein, the step of activating the call diversion service comprises:
    after the identification process performed on the first phone number is finished, receiving the second phone number; and
    diverting the telecommunication signal which is to be forwarded to the first phone number to the second phone number.

2. The remote control method of claim 1, wherein the first terminal apparatus is at a signal transmitting-and-receiving termination state, a system idle state or a no-responding state.

3. The remote control method of claim 1, wherein the first terminal apparatus is different from the second terminal apparatus.

4. The remote control method of claim 1, wherein the step of connecting the second terminal apparatus to the telecommunication server comprises:
    using the second terminal apparatus to dial the first phone number to connect the second terminal apparatus to the telecommunication server so as to enter a voice mail box corresponding to the first phone number in the telecommunication server.

5. A remote control system, comprising:
    a first terminal apparatus, wherein the first terminal apparatus corresponds to a first phone number;
    a second terminal apparatus;
    a telecommunication server, wherein the telecommunication server corresponds to a telecommunication service provider providing the first phone number a telecommunication service and the telecommunication server comprises:
    a telecommunication interface, wherein the second terminal apparatus connects to the telecommunication server through the telecommunication interface;
    a storage device for storing a computer readable and writable program;
    a processing unit for executing a plurality of instructions of the computer readable and writable program, wherein the instructions comprises, when using the second terminal apparatus to dial the first phone number to connect the second terminal apparatus to the telecommunication server, activating a call diversion service on the telecommunication server in order to divert a telecommunication signal which is to be forwarded to the first phone number to a second phone number, wherein, the instructions comprises:
    performing an identification process on the first phone number;
    wherein, the instruction of activating the call diversion service comprises:
    after the identification process performed on the first phone number is finished, receiving the second phone number; and
    diverting the telecommunication signal which is to be forwarded to the first phone number to the second phone number.

6. The remote control system of claim 5, wherein the first terminal apparatus is at a signal transmitting-and-receiving termination state, a system idle state or a no-responding state.

7. The remote control system of claim 5, wherein the first terminal apparatus is different from the second terminal apparatus.

8. A remote control method for a first terminal apparatus, wherein the first terminal apparatus corresponds to a first phone number, the method comprising:
    connecting a second terminal apparatus to a telecommunication server, wherein the telecommunication server corresponds to a telecommunication service provider who provides the first phone number a telecommunication service; and
    through using the second terminal apparatus to dial the first phone number to connect the second terminal apparatus to the telecommunication server, activating a call diversion service by the second terminal apparatus on the telecommunication server in order to divert a telecommunication signal which is to be forwarded to the first phone number to a second phone number.

9. The remote control method of claim 8, wherein the first terminal apparatus is at a signal transmitting-and-receiving termination state, a system idle state or a no-responding state.

10. The remote control method of claim 8, wherein the first terminal apparatus is different from the second terminal apparatus.

11. The remote control method of claim 8, wherein the step of connecting the second terminal apparatus to the telecommunication server comprises:
    using the second terminal apparatus to dial the first phone number to connect the second terminal apparatus to the telecommunication server so as to enter a voice mail box corresponding to the first phone number in the telecommunication server.

* * * * *